A. STEINBÖK,

Assignor to A. WEIDMANN & Co.

TOY GUN.

No. 9,822. Reissued July 26, 1881.

WITNESSES:

Carl Karp

Joh. H. Rosenbaum

INVENTOR

August Steinbök

BY Paul Goepel

ATTORNEY

N. PETERS, Photo-Lithographer, Washington, D. C.

UNITED STATES PATENT OFFICE.

AUGUST STEINBÖK, OF NUREMBERG, BAVARIA, GERMANY, ASSIGNOR TO A. WEIDMANN & CO., OF NEW YORK, N. Y.

TOY GUN.

SPECIFICATION forming part of Reissued Letters Patent No. 9,822, dated July 26, 1881.

Original No. 153,689, dated August 4, 1874. Application for reissue filed June 15, 1881.

*To all whom it may concern:*

Be it known that I, AUGUST STEINBÖK, of Nuremberg, Bavaria, in the Empire of Germany, have invented certain new and useful Improvements in Toy Guns, of which the following is a specification.

This invention has reference to improvements in that class of toy guns in which a spring-acted piston is employed to throw the ramrod or other object, the improvements being specially designed to adapt this style of toy guns for the use of percussion-caps.

The invention consists of a toy gun provided with a spring-acted piston, the piston-rod of which is arranged at the rear end with a hammer and guided by a slotted barrel. The hammer works in connection with an anvil or abutment of the barrel at the forward end of the guide-slot, so as to explode a suitable percussion-cap when the piston-rod is released from the trigger.

Figure 1:
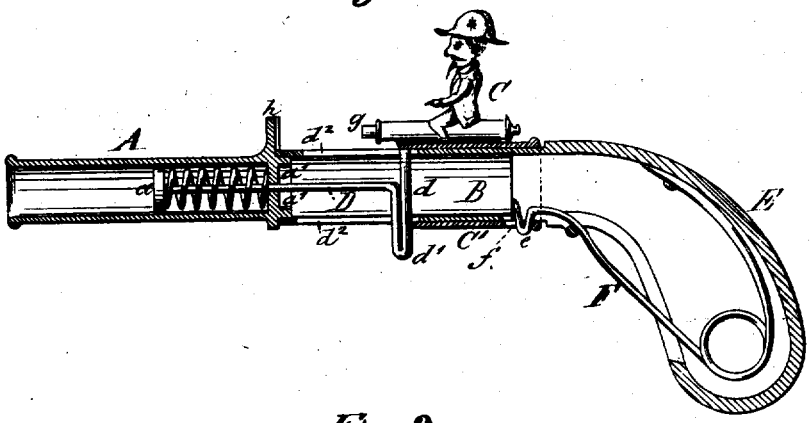
Figure 2:
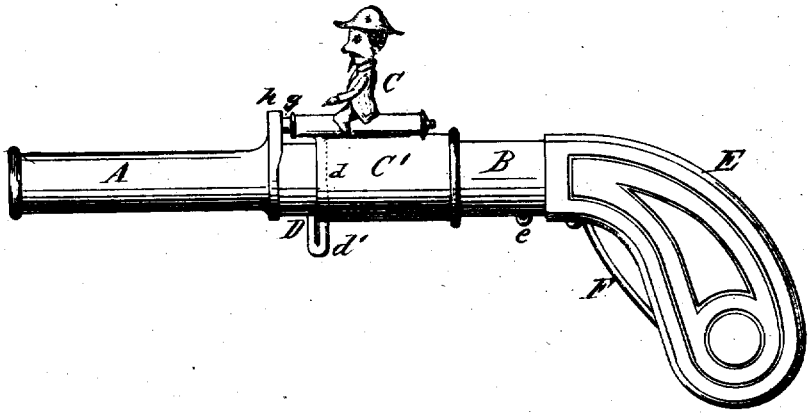

In the accompanying drawings, Figure 1 represents a vertical longitudinal section of my improved toy gun, shown in cocked position; and Fig. 2 is a side elevation of the same as discharged.

Similar letters of reference indicate corresponding parts.

In the drawings, A represents the barrel of a toy gun, which, like its breech part, B, is made of sheet metal or any other suitable cheap material. At the inside of the barrel A is arranged a piston, *a*, which is attached to the front end of a piston-rod, D, the piston being acted upon by a spiral spring, *b*, interposed between it and an interior shoulder, *a'*, of the barrel A. The rear end of the piston-rod D is provided, at right angles thereto, with a piece, *d*, which extends diametrically through the barrel, the lower end passing through a guide-slot, $d^2$, at the lower part of the barrel, and forming a finger-piece, *d'*, while the upper end passes through a second guide-slot, $d^2$, at the top of the barrel. A hammer, C, is attached to the upper end of the diametrical piece *d*, outside of the barrel, and provided with a nipple, *g*, for the reception of a percussion-cap, as shown clearly in Fig. 1. Either the finger-piece *d'* or the hammer C may be used for forcing the spring-acted piston back against the action of its spring *b*. A guide-sleeve, C', is furthermore attached to the diametrical piece *d* of the piston-rod D, which guide-sleeve encircles the breech part B of the barrel and serves as an additional guide device for the piston-rod. In the butt E of the gun is arranged a spring-acted trigger, F, which catches by a nose, *e*, into a slot, *f*, of the sleeve C whenever the sleeve is forced back far enough for this purpose, so as to set the trigger.

In carrying back the piston-rod either by the hammer or finger-piece its spiral spring is compressed, so as to shoot the ramrod, pea, or other article placed into the barrel whenever the sleeve and piston-rod are released by the pulling of the trigger. By the forward motion of the piston-rod the hammer strikes against a freed exterior anvil or abutment, *h*, of the barrel at the forward end of the upper guide-slot, which abutment is provided with side flanges, so as to explode the cap simultaneously with the throwing of the ramrod. By the side flanges of the anvil or abutment *h* any fragments of the cap are prevented from being thrown about so as to produce injury.

By this means a cheap and simple toy gun is produced, which furnishes increased amusement to children, as it adds to the throwing of the ramrod the explosion of a percussion-cap, without the least danger of injury.

Having thus described my invention, I claim as new and desire to secure by Letters Patent—

1. In a toy gun, the combination of a barrel having a fixed exterior anvil or abutment and a slotted breech part back of the anvil, with a spring-acted piston and an exterior hammer, which is attached to the rear end of the piston-rod and guided by the slotted part of the barrel, substantially as set forth.

2. In a toy gun, the combination of a barrel, A, having a fixed exterior anvil or abutment, *h*, and a slotted breech part, B, back of the same, with an interior spring-acted piston, *a*, a piston-rod, D, guided by a cross-bar, *d*, in the slotted part of the barrel, and an exterior hammer, C, attached to the cross-bar, substantially as set forth.

3. In a toy gun, the combination of a barrel, A, having a fixed anvil or abutment, *h*, and guideslots $d^2$ back of the same, with an interior spring-acted piston, *a*, a piston-rod, D, and a hammer, C, attached to the rear end of the piston-rod, substantially as and for the purpose set forth.

4. In a toy gun, the combination of a barrel, A, having an exterior anvil or abutment, *h*, a slotted breech part, B, back of the same, and an interior spring-acted piston, *a*, with a piston-rod, D, carrying an exterior hammer, C, and guide-sleeve C′, and with a spring-trigger, F, which engages by a nose or catch with the guide-sleeve C′, all substantially as described.

In testimony that I claim the foregoing as my invention I have signed my name, in presence of two witnesses, this 30th day of March, 1881.

AUG. STEINBÖK.

Witnesses:
G. HENRY HORSTMANN,
ALFRED MUSSINAN.